United States Patent
Kadono

(10) Patent No.: US 10,354,695 B2
(45) Date of Patent: Jul. 16, 2019

(54) DATA RECORDING CONTROL DEVICE AND DATA RECORDING CONTROL METHOD

(71) Applicant: Panasonic Intellectual Property Management Co., Ltd., Osaka (JP)

(72) Inventor: Shinya Kadono, Fukuoka (JP)

(73) Assignee: PANASONIC INTELLECTUAL PROPERTY MANAGEMENT CO., LTD, Osaka (JP)

( * ) Notice: Subject to any disclaimer, the term of this patent is extended or adjusted under 35 U.S.C. 154(b) by 0 days.

(21) Appl. No.: 16/034,833

(22) Filed: Jul. 13, 2018

(65) Prior Publication Data

US 2019/0027191 A1 Jan. 24, 2019

(30) Foreign Application Priority Data

Jul. 20, 2017 (JP) .................................. 2017-140919

(51) Int. Cl.
 *H04N 9/80* (2006.01)
 *G11B 27/34* (2006.01)
 *G11B 20/10* (2006.01)
 *H04N 5/93* (2006.01)

(52) U.S. Cl.
 CPC ........ *G11B 27/34* (2013.01); *G11B 20/10527* (2013.01); *G11B 2020/10537* (2013.01)

(58) Field of Classification Search
 CPC .............. G11B 27/34; G11B 20/10527; G11B 2020/10537

USPC ....... 386/239, 248, 278, 326, 330, 331, 332, 386/336, 353
See application file for complete search history.

(56) References Cited

U.S. PATENT DOCUMENTS

| | | | | |
|---|---|---|---|---|
| 2003/0083864 | A1* | 5/2003 | Matsui | H04N 21/85406 704/200.1 |
| 2009/0066783 | A1* | 3/2009 | Lee | H04N 19/70 348/43 |
| 2015/0201202 | A1* | 7/2015 | Hattori | H04N 19/70 375/240.02 |

FOREIGN PATENT DOCUMENTS

JP 2005-348078 12/2005

* cited by examiner

*Primary Examiner* — Robert Chevalier
(74) *Attorney, Agent, or Firm* — Wenderoth, Lind & Ponack, L.L.P.

(57) ABSTRACT

A data recording control device includes a recording preparator that generates the file which includes a file type box including information related to a type indicating a type of a player capable of reproducing the file and header information of a media data box storing media data according to the stream data, on the recording media; a box determiner that writes a movie box which includes information used for reproducing the media data, updates a box size included in the header information of the media data box to a size of immediately before the movie box, and appends header information of a free space box which stores predetermined information to a tail of the movie box, during a predetermined period; and a data writer that appends the media data according to the stream data to a tail of the header information of the free space box.

5 Claims, 13 Drawing Sheets

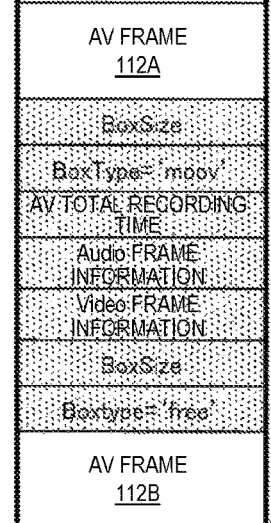
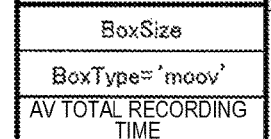
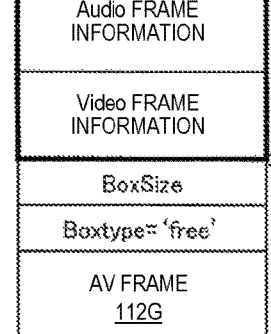

DATA RECORDING CONTROL DEVICE AND DATA RECORDING CONTROL METHOD

BACKGROUND

1. Technical Field

The present disclosure is related to a data recording control device and a data recording control method.

2. Description of the Related Art

As a device for recording audio/visual (AV) stream data (hereinafter, simply referred to as "stream data") received via a communication network or a broadcast network as AV file data (hereinafter, simply referred to as "file"), there is a device which directly records the file in an external storage such as a universal serial bus (USB) memory device or a secure digital (SD) memory card without embedding a mass storage for miniaturization and weight lightening and/or cost down.

As a file format for recording the AV data, MP4 Ver. 1 is usually used. MP4 Ver. 1 defines that one file includes only one media data box for storing the AV data and only one movie box for storing information such as a storage location and a reproduction order of the AV data in the media data box. However, many reproduction systems corresponding to MP4 Ver. 1 can actually reproduce only simplified specifications including one media data box and one movie box. In the related art, after reception of the stream data is completed and all of pieces of the AV data is stored in the media data box, the movie box is generated. Therefore, since the file partially recorded in the external storage does not conform to MP4 Ver. 1 (damaged) if the external storage is removed while the stream data is recorded in the external storage as a file, an MP4 player cannot reproduce the file.

In order to solve such a problem, JP-A-2005-348078 discloses a technology of recording fragment data in the SD memory card at a timing when the fragment data for one fragment by MP4 Ver. 2 is accumulated, updating a total recording time of a fragment_duration field of a header of a first fragment, and enabling to reproduce the fragment data recorded on the SD memory card even if the SD memory card is removed during recording the stream data.

However, since JP-A-2005-348078 is based on the premise of MP4 Ver. 2, the MP4 player corresponding to only MP4 Ver. 1 cannot reproduce a file generated by JP-A-2005-348078. Since MP4 Ver. 1 has a function necessary for reproducing the AV data and all of MP4 players corresponding to MP4 Ver. 2 can reproduce the AV data, an advantage of recording the AV data by MP4 Ver. 1 is large.

SUMMARY

The present disclosure is to provide a data recording control device and a data recording control method capable of reproducing data written until an external storage is removed, by an MP4 player corresponding to MP4 Ver. 1 even in a case where the external storage is removed while stream data is recorded on the external storage (recording media) as a file.

According to one aspect of the present disclosure, there is provided a data recording control device which records stream data on a recording media as a file, the device including: a recording preparator that generates the file which includes a file type box including information related to a type indicating a type of a player capable of reproducing the file and header information of a media data box storing media data according to the stream data, on the recording media; a box determiner that writes a movie box which includes information used for reproducing the media data, updates a box size included in the header information of the media data box to a size of immediately before the movie box, and appends header information of a free space box which stores predetermined information to a tail of the movie box, during a predetermined period; and a data writer that appends the media data according to the stream data to a tail of the header information of the free space box.

According to the present disclosure, it is possible to reproduce data written until an external storage is removed, by an MP4 player corresponding to MP4 Ver. 1 even in a case where the external storage is removed while stream data is recorded on the external storage (recording media) as a file.

DETAILED DESCRIPTION

Hereinafter, embodiments will be described with reference to drawings.

Embodiment 1

File Format of MP4 Ver. 1

First, a file format of MP4 Ver. 1 will be described with reference to FIG. 1.

Figure 1:
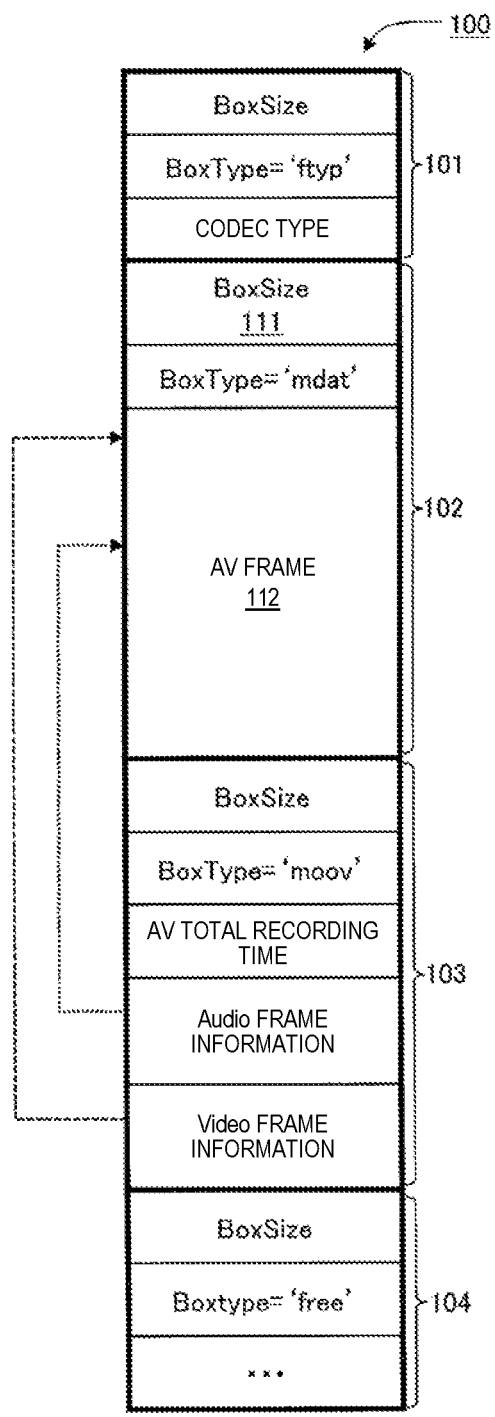
FIG. 1 is a diagram illustrating a configuration example of a file format of MP4 Ver. 1.

As illustrated in FIG. 1, in file 100 conforming to MP4 Ver. 1, file type box 101 is disposed in a head of file 100 and, for example, media data box 102, movie box 103, and free space box 104 are disposed in a tail of file type box 101. Media data box 102, movie box 103, and free space box 104 may be arranged in any order. One file type box 101 and one movie box 103 are respectively disposed in the file of MP4 Ver. 1. In MP4 Ver. 1 standards, a plurality of media data boxes 102 and a plurality of free space boxes 104 are respectively disposed in file 100, but since there is a player which can reproduce only a file having one media data box 102, file 100 preferably has one media data box 102.

File type box 101 stores information on a box size of file type box 101, information on a box type of "ftyp" indicating that the box is "file type box", and a codec type of an audio frame and a video frame (hereinafter, referred to as "AV frame") included in file 100. The codec type is information indicating types of a codec of the audio frame and a codec of the video frame and is used for reproducing the AV frame. An example of the audio codec is advanced audio coding (AAC). An example of the video codec is ITU-T H.264 or ITU-T H.265.

Media data box 102 stores information on box size 111 of media data box 102, information on the box type of "mdat" indicating that the box is "media data box", and AV frame 112.

Movie box 103 stores information on the box size of movie box 103, information on the box type of "moov" indicating that the box is "movie box", information on an AV total recording time, a plurality of pieces of audio frame information, and a plurality of pieces of video frame information. The AV total recording time is information indicating a recording time of all of the AV frames included in the MP4 file. Each of the pieces of audio frame information is information indicating a reference destination of each of the audio frames recorded in media data box 102 and is used for reproducing the audio frame in chronological order. Each of the pieces of video frame information is information indicating a reference destination of each of the video frames recorded in media data box 102 and is used for reproducing the video frame in chronological order.

Free space box 104 stores information on the box size of free space box 104, information on the box type of "free" indicating that the box is "free space box", and predetermined data. Since the predetermined data stored in free space box 104 is to be ignored in MP4 standards, a general MP4 player ignores the data stored in free space box 104.

Configuration of Data Recording Control Device

Next, a configuration of data recording control device 10 will be described with reference to FIG. 2.

Data recording control device 10 includes operation receptor 201, reception processor 202, buffer unit 203, stream analyzer 204, stream convertor 205, recording preparator 206, data writer 207, and box determiner 208.

Operation receptor 201 receives an operation by a user. For example, when receiving the operation of starting to record the stream data from the user, operation receptor 201 notifies recording preparator 206 of a recording start instruction. When receiving the operation of ending to record the stream data from the user, operation receptor 201 notifies box determiner 208 of a recording end instruction.

Reception processor 202 receives the stream data transmitted from stream transmission source 21 via a predetermined network and stores the stream data in buffer unit 203.

Buffer unit 203 is configured on a memory (for example, RAM 1105 in FIG. 13) in data recording control device 10. For example, in a case of a TV conference system, stream transmission source 21 corresponds to a stream transmission device which transmits AV data on the other side captured and collected by a camera and a microphone as stream data via the network. For example, in a case of a program broadcasting system, stream transmission source 21 corresponds to a stream transmission device which transmits the AV data constituting a program as stream data via the network.

Stream analyzer 204 analyzes the stream data stored in buffer unit 203 and transmits information on an analysis result to stream convertor 205. The information on the analysis result of the stream data includes, for example, information on the format of the stream data, information on the codec of AV frame 112, information on a bitrate, and the like.

Stream convertor 205 converts the stream data stored in buffer unit 203 into data of file 100 in external storage 22 by using the information of the analysis result of the stream data. In a case where the AV frame of the stream data, and the codec and the bitrate are maintained as it is and are recorded as file 100 in external storage 22, stream convertor 205 converts only the format of the data without changing an ES data (data body obtained by compressing AV) frame of the AV. For example, stream convertor 205 converts a real-time transport protocol (RTP) format as typical real-time communication related to the stream data into an ES format of the media data box of MP 4 Ver. 1 related to file 100 of external storage 22.

Recording preparator 206 performs preparation for recording the stream data as file 100 in external storage 22 at a timing when receiving the recording start instruction from operation receptor 201. Details will be described below in "Details of Recording Process on External Storage".

Data writer 207 appends AV frame 112 converted by stream convertor 205 to file 100. In addition, data writer 207 holds AV frame information on appended AV frame 112 in the memory. Further, in a case of receiving an instruction of stopping the process of appending AV frame 112, from box determiner 208, data writer 207 stops the process of appending AV frame 112. Details will be described below in "Details of Recording Process on External Storage".

Box determiner 208 determines media data box 102 during a predetermined period or at a predetermined timing. Specifically, during the predetermined period, box determiner 208 appends movie box 103 including the AV frame information for all of the AV frames in media data box 102, after then, box determiner 208 changes box size 111 of media data box 102 to a size of immediately before appended movie box 103. The predetermined period is measured by, for example, a period timer set to a predetermined time. In addition, the predetermined timing is, for example, a timing when receiving the recording end instruction from operation receptor 201. Further, while determining media data box 102, box determiner 208 instructs data writer 207 to stop the process of appending the AV frame. After the process of appending the AV frame is completed, box determiner 208 instructs data writer 207 to restart the process of appending the AV frame. Details will be described below in "Details of Recording Process on External Storage".

Details of Recording Process on External Storage

Next, the details of a process according to Embodiment 1, of recording the stream data as file 100 in external storage 22 will be described with reference to a schematic diagram of file 100 in FIG. 3 and a flowchart in FIG. 4.

First, when receiving the recording start instruction from operation receptor 201, recording preparator 206 writes file type box 101 of file 100 to external storage 22 (ST 101).

Figure 3A:
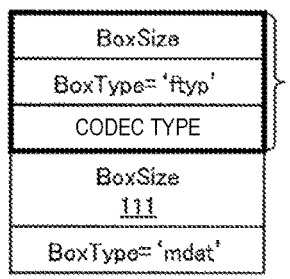
FIGS. 3A-3C are diagrams illustrating a configuration example of a file according to Embodiment 1.

Next, recording preparator 206 appends header information (box size 111 and box type of "mdat") of media data box 102 to the tail of file type box 101 of file 100 (ST 102). According to the processes of ST 101 and ST 102, file 100 illustrated in FIG. 3A is generated in external storage 22.

The next processes of ST 103 to ST 110 are processes for the MP4 player corresponding to MP4 Ver. 1 to reproduce the AV frame recorded for a setting time of the period timer. The process is referred to as "box determining process". Hereinafter, a first box determining process will be firstly described, then a second box determining process will be described.

First Box Determining Process

Box determiner 208 starts the period timer (ST 103).

Figure 3B:
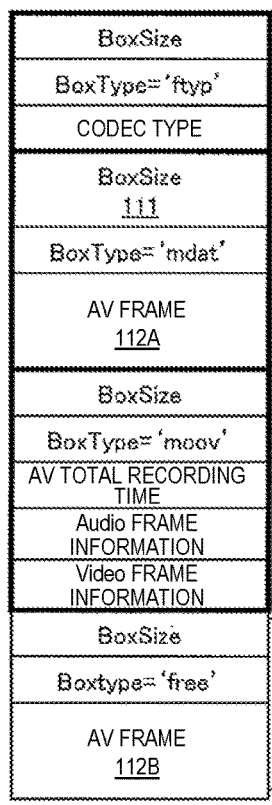

Next, as illustrated in FIG. 3B, data writer 207 appends AV frame 112A related to the received stream data, to the tail of the header information of media data box 102 appended in ST 102 (ST 104).

Next, data writer 207 holds the AV frame information corresponding to AV frame 112A appended in ST 104, in the memory (ST 105).

Next, box determiner 208 determines whether or not the period timer started in ST 103 is completed or whether or not the recording end instruction is received (ST 106).

In a case where the period timer is not completed and in a case where the recording end instruction is not received (NO in ST 106), the flow returns to ST 104.

In a case where the period timer is completed or in a case where the recording end instruction is received (YES in ST 106), as illustrated in FIG. 3B, box determiner 208 appends movie box 103 including all of pieces of the AV frame information (that is, AV frame information on all of AV frames in media data box 102) held in the memory, to the tail of AV frame 112A appended in ST 104 (ST 107).

Next, box determiner 208 changes box size 111 of media data box 102 to the size of immediately before movie box 103 appended in ST 107 (ST 108).

Next, box determiner 208 determines whether or not a determination result of YES in ST 106 is obtained by receiving the recording end instruction (ST 109). In a case where the determination result of YES in ST 106 is obtained by receiving the recording end instruction (YES in ST 109), the flow is completed.

In a case where the determination result of YES in ST 106 is not obtained by receiving the recording end instruction, that is, in a case where the determination result of YES in ST 106 is obtained by the period timer being completed (NO in ST 109), as illustrated in FIG. 3B, box determiner 208 appends the header information of free space box 104 to the tail of movie box 103 appended in ST 107 (ST 110). Then, the flow returns to ST 103. Next, the process after the flow returns to ST 103, that is, the second box determining process will be described.

Second Box Determining Process

Box determiner 208 starts the period timer (ST 103).

Next, as illustrated in FIG. 3B, data writer 207 appends AV frame 112B to the tail of the header information of free space box 104 (ST 104).

Next, data writer 207 holds the AV frame information corresponding to AV frame 112B appended in ST 104, in the memory (ST 105).

Next, box determiner 208 determines whether or not the period timer started in ST 103 is completed or whether or not the recording end instruction is received (ST 106).

In a case where the period timer is not completed and in a case where the recording end instruction is not received (NO in ST 106), the flow returns to ST 104.

Figure 3C:
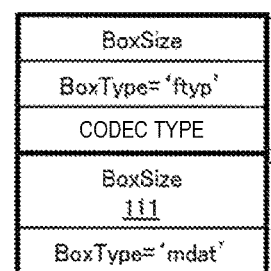

In a case where the period timer is completed or in a case where the recording end instruction is received (YES in ST 106), as illustrated in FIG. 3C, box determiner 208 appends movie box 103 including all of the pieces of the AV frame information held in the memory, to the tail of AV frame 112B appended in ST 104 (ST 107). Even if external storage 22 is removed at this time, since it is not possible to reproduce the AV frame since AV frame 112B is started to be appended until external storage 22 is removed, but the frames following movie box 103 including the AV frame information of AV frame 112A are entirely interpreted by free space box 104 and the MP4 player, the MP4 player can reproduce AV frame 112A.

Next, box determiner 208 changes box size 111 of media data box 102 to the size of immediately before movie box 103 (ST 108). Accordingly, even if external storage 22 is removed after this time, the MP4 player can reproduce AV frames 112A and 112B recorded until at least this time.

Next, box determiner 208 determines whether or not a determination result of YES in ST 106 is obtained by receiving the recording end instruction (ST 109). In a case where the determination result of YES in ST 106 is obtained by receiving the recording end instruction (YES in ST 109), the flow is completed.

In a case where the determination result of YES in ST 106 is not obtained by receiving the recording end instruction, that is, in a case where the determination result of YES in ST 106 is obtained by the period timer being completed (NO in ST 109), as illustrated in FIG. 3C, box determiner 208 appends the header information of free space box 104 to the tail of movie box 103 appended in ST 107 (ST 110). Then, the flow returns to ST 103. A third box determining process and subsequent box determining processes are the same processes as the second box determining process.

Here, FIG. 3B illustrates file 100 of external storage 22 when the first box determining process is completed and FIG. 3C illustrates file 100 of external storage 22 when the second box determining process is completed. In file 100 of FIG. 3C, the AV frame information corresponding to AV frames 112A and 112B is stored in movie box 103. The MP4 player can reproduce AV frames 112A and 112B recorded at the time of FIG. 3C without any problems with reference to the AV frame information of movie box 103.

Since information of a hatching area which exists between AV frame 112A and AV frame 112B in FIG. 3C is not referred by the AV frame information of movie box 103, the information does not affect reproducing. In addition, since AV frame 112C in FIG. 3C appended in the third box determining process is stored in free space box 104, even if external storage 22 is removed during the process, AV frame 112C is not reproduced, but AV frames 112A and 112B in media data box 102 are reproduced.

Therefore, even if external storage 22 is removed at any timing of adding AV frame 112, adding movie box 103, or adding free space box 104, AV frame 112 determined until then by the box determining process is reproduced without any problems by the MP4 player corresponding to MP4 Ver. 1. That is, even if external storage 22 is removed at any timing after movie box 103 is appended (ST 107) and box size 111 of media data box 102 is changed (ST 108), AV frame 112 recorded until at least the process in ST 108 is reproduced without any problems by the MP4 player corresponding to MP4 Ver. 1.

Effect of Embodiment 1

According to Embodiment 1, in file 100 of external storage 22, data writer 207 appends the AV frame related to the received stream data to the tail of the header information of free space box 104, and box determiner 208 appends movie box 103 and the header information of free space box 104 during the predetermined period and updates box size 111 of media data box 102.

Accordingly, even if external storage 22 is removed while the stream data is recorded in external storage 22 as file 100, external storage 22 includes movie box 103 corresponding to AV frame 112 in media data box 102 and file 100 with correct box size 111 of media data box 102 remains. In addition, as illustrated in FIG. 3C, since the AV frame not referred by movie box 103 is stored in free space box 104, file 100 remaining in external storage 22 conforms to MP4 Ver. 1. Therefore, the MP4 player corresponding to MP4 Ver. 1 can reproduce file 100 remaining in external storage 22 without any problems.

Embodiment 2

As illustrated in FIG. 3C, in Embodiment 1, the garbage data (hatching part in FIG. 3C) which exists between AV frame 112A and AV frame 112B of media data box 102 remains as it is. Since the garbage data is not much when a recording time is short, but the amount of the AV frame information increases when the recording time becomes longer, a proportion of the garbage data in file 100 increases. At this time, in Embodiment 2, AV frame 112 is overwritten to a part of the garbage data. Accordingly, since the proportion of the garbage data in file 100 decreases, it is possible to reduce a data size of file 100. Hereinafter, the operation will be described in detail.

Configuration of Data Recording Control Device

Next, a configuration of data recording control device 11 according to Embodiment 2 will be described with reference to FIG. 5. In Embodiment 2, the same reference numerals are given to the same components as those of Embodiment 1, and description thereof will be omitted.

Figure 2:
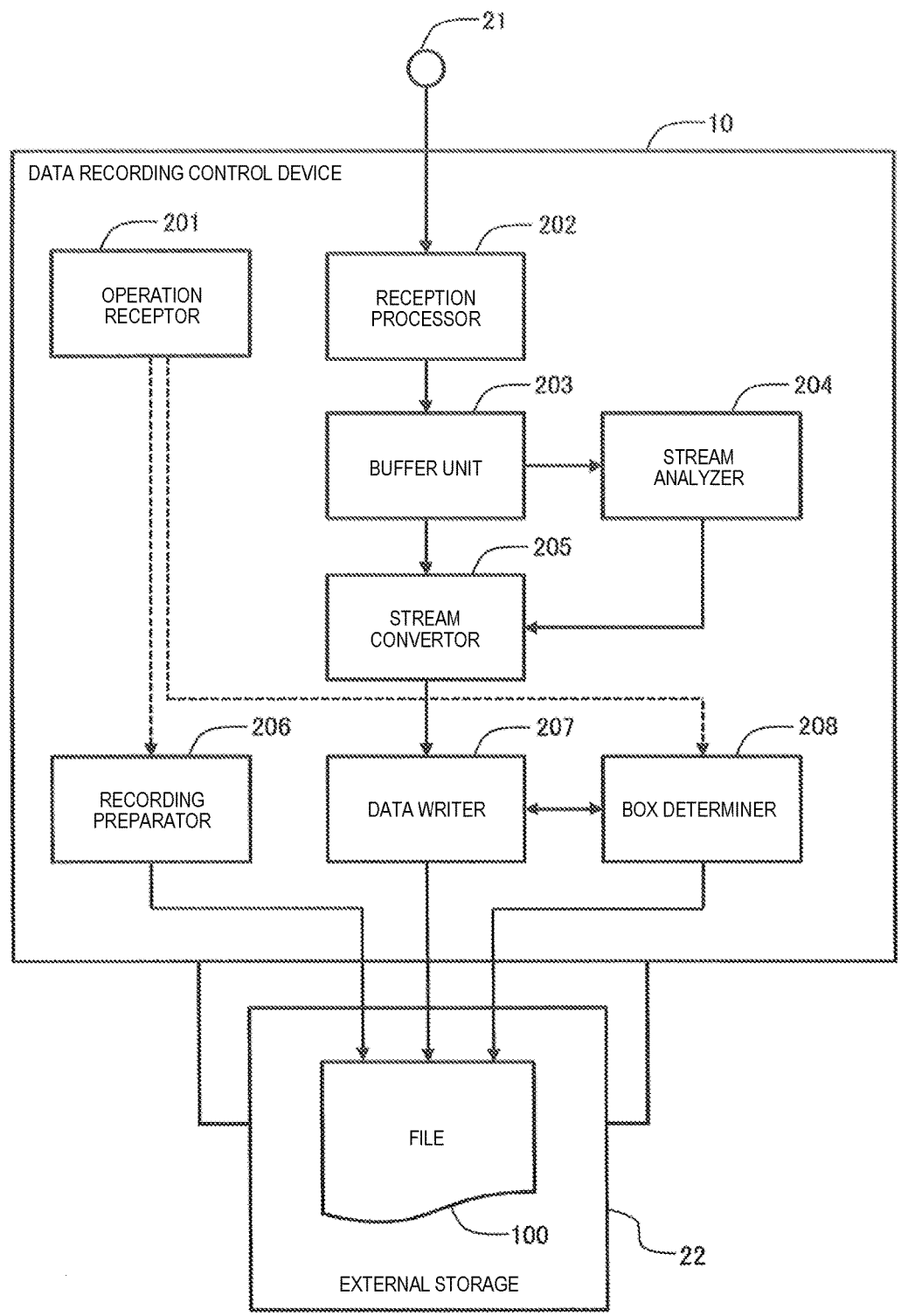
FIG. 2 is a block diagram illustrating a configuration example of a data recording control device according to Embodiment 1.
Figure 5:
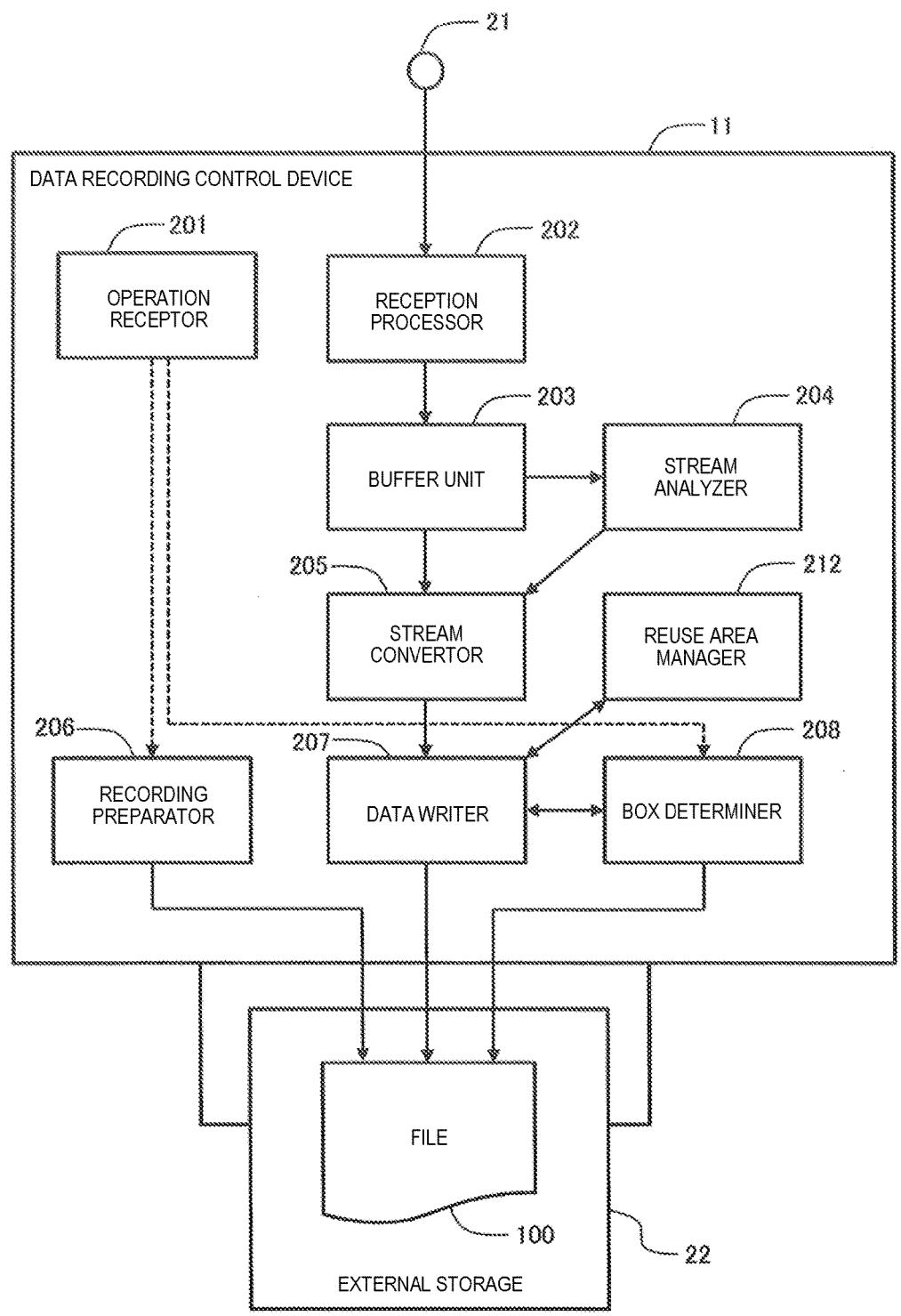
FIG. 5 is a block diagram illustrating a configuration example of a data recording control device according to Embodiment 2.

Data recording control device 11 illustrated in FIG. 5 includes reuse area manager 212 in addition to the configuration illustrated in FIG. 2.

Reuse area manager 212 manages a reuse area to which AV frame 112 can be written. The reuse area is an area which becomes a garbage by appending latest movie box 103 and the header information of free space box 104 to the area, that is, an area of movie box 103 and the header information of free space box 104 before latest movie box 103 and the header information of free space box 104 are appended to the area. Details of the reuse area will be described below.

In addition, when writing AV frame 112 to file 100, data writer 207 inquires of reuse area manager 212 whether or not the reuse area exists. In a case where the reuse area equal to or larger than a predetermined size exists, data writer 207 preferentially overwrites AV frame 112 to the reuse area. Here, the predetermined size may be the amount of data of AV frame 112 recorded during the one box determining process. The amount of data can be calculated based on the bitrate of the stream data and a period (time) set in the period timer.

Details of Reuse Area

Figure 6A:
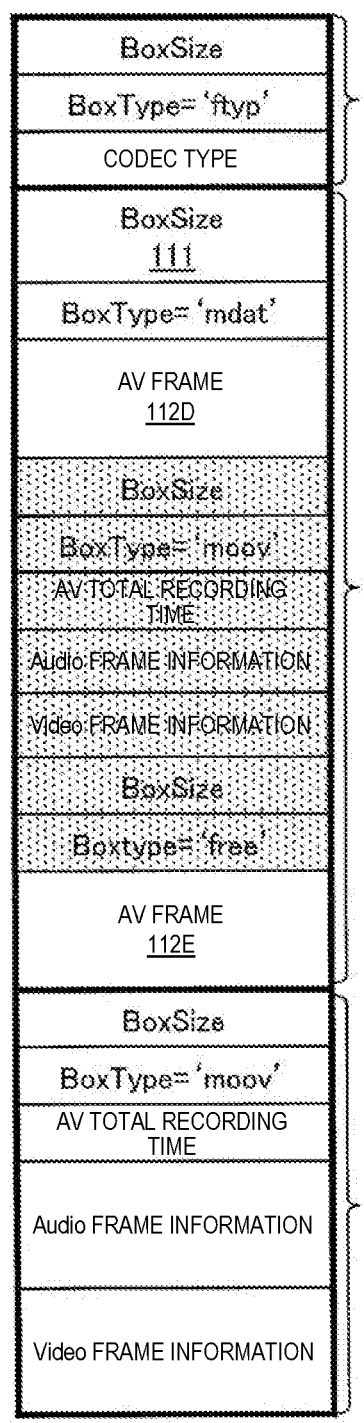
FIGS. 6A and 6B are diagrams illustrating a configuration example of a file according to Embodiment 2.

Next, details of the reuse area will be described with reference to FIG. 6. Here, FIG. 6A illustrates file 100 after the second box determining process and FIG. 6B illustrates file 100 after the third box determining process according to Embodiment 2.

At a timing after the second box determining process, the previous movie box and the header information of the previous free space box (hatching area in FIG. 6A) which exist in media data box 102, appended in the first box determining process become the garbage area. Reuse area manager 212 manages the garbage area (hatching area in FIG. 6A) as the reuse area.

Figure 6B:
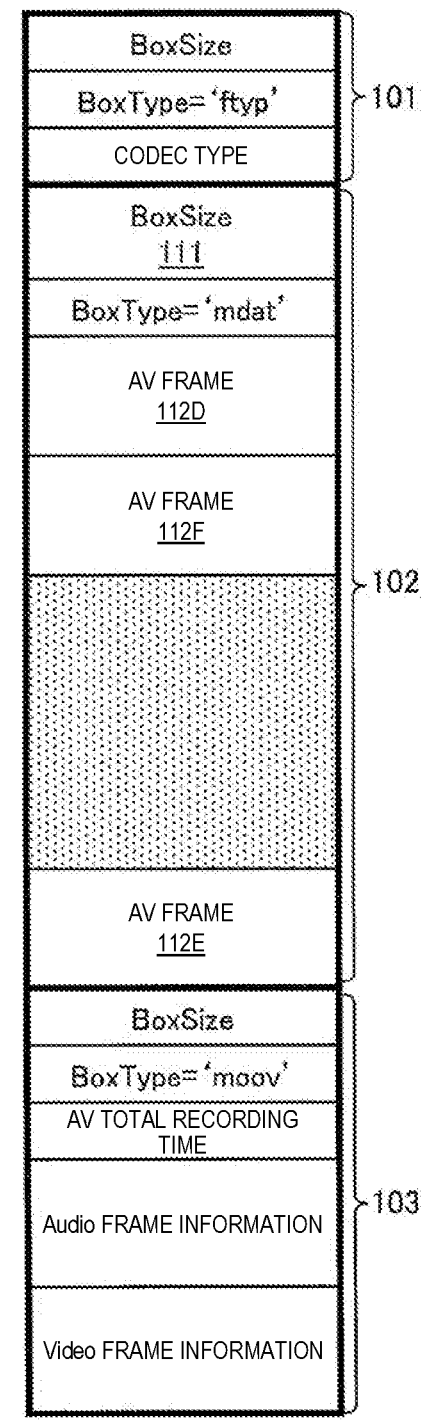

Then, as illustrated in FIG. 6B, in a case where the reuse area exist, data writer 207 according to Embodiment 2 preferentially overwrites AV frame 112F to the reuse area. Accordingly, it is possible to reduce the data size of file 100 as compared with Embodiment 1. Since a reproduction order of the AV frames is managed by the AV frame information of movie box 103, even if AV frames 112 in media data box 102 are not arranged in chronological order, the MP4 player can reproduce the AV frames.

Details of Recording Process on External Storage

Figure 7:
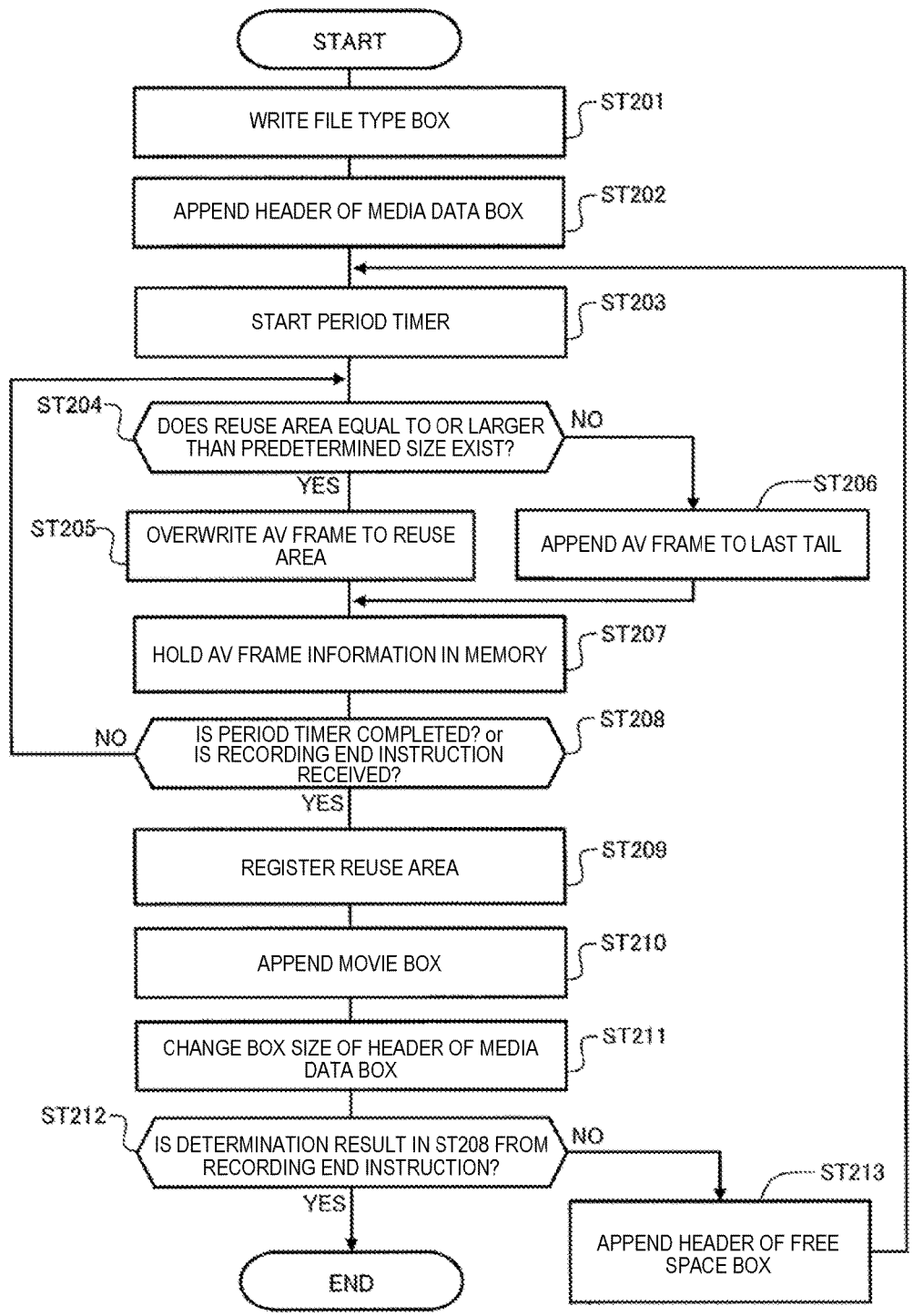
FIG. 7 is a flowchart illustrating an example of a recording process on the external storage according to Embodiment 2.

Next, details of a process according to Embodiment 2, of recording the stream data as file 100 in external storage 22 will be described with reference to a schematic diagram of file 100 in FIG. 6 and a flowchart in FIG. 7.

First, data recording control device 11 performs processes in ST 201 and ST 202. Since the processes in ST 201 and ST 202 are the same as the processes in ST 101 and ST 102 in FIG. 4, description thereof will be omitted.

Next, box determiner 208 starts the period timer (ST 203).

Next, data writer 207 inquires of reuse area manager 212 whether or not the reuse area equal to or larger than the predetermined size exists and determines whether or not the reuse area equal to or larger than the predetermined size exists (ST 204).

In a case where the reuse area equal to or larger than the predetermined size exists (YES in ST 204), data writer 207 overwrites AV frame 112 to the reuse area (for example, hatching area in FIG. 6B) (ST 205) and moves to ST 207.

Figure 4:
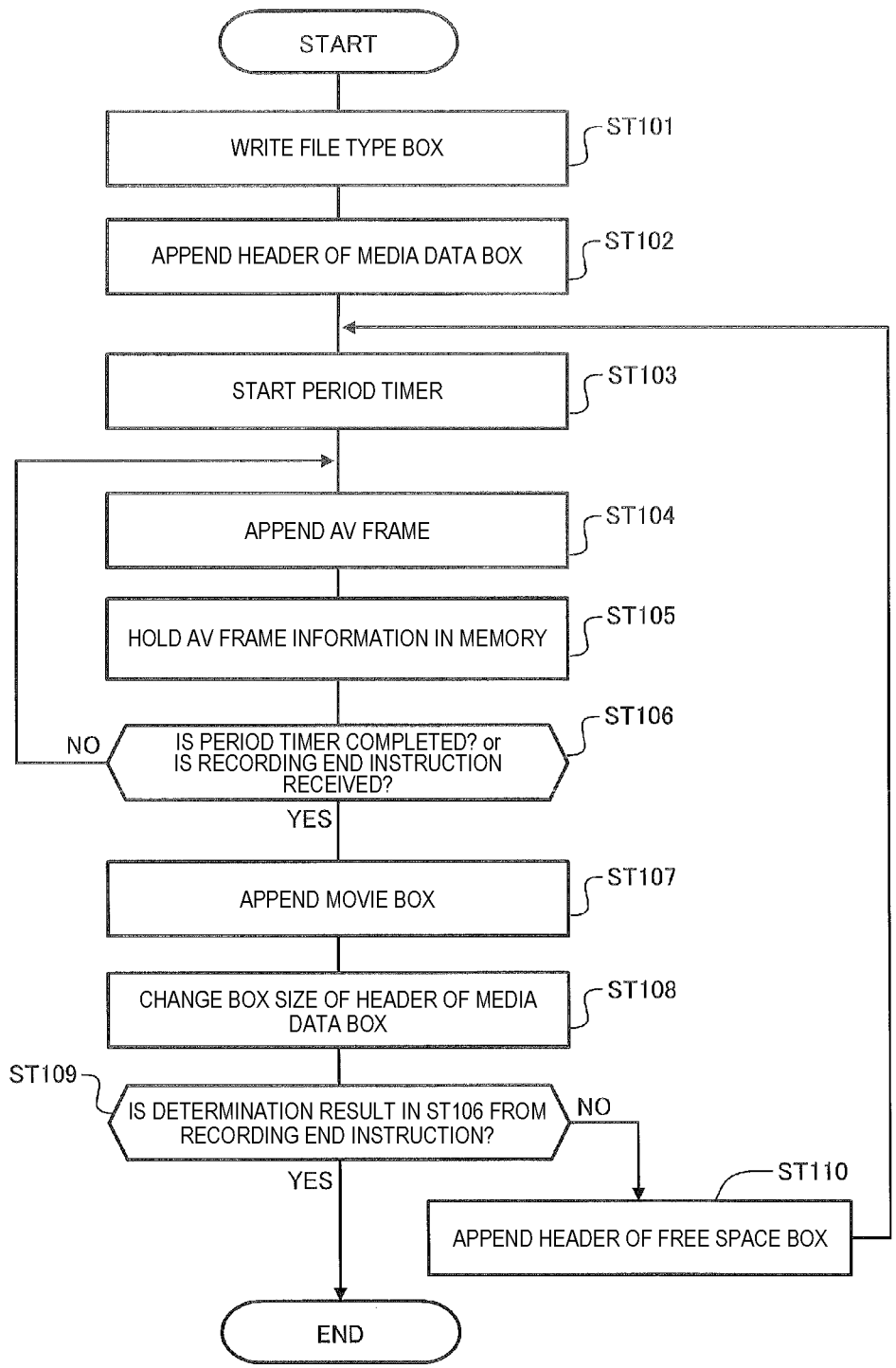
FIG. 4 is a flowchart illustrating an example of a recording process on an external storage according to Embodiment 1.

In a case where the reuse area equal to or larger than the predetermined size does not exist (NO in ST 204), data writer 207 appends AV frame 112 to the tail of the header information of free space box 104 (ST 206) in the same manner as ST 104 in FIG. 4. Then, the flow moves to ST 207.

Next, data writer 207 holds the AV frame information corresponding to AV frame 112 written in ST 205 or ST 206, in the memory (ST 207).

Next, box determiner 208 determines whether or not the period timer started in ST 203 is completed or whether or not the recording end instruction is received (ST 208).

In a case where the period timer is not completed and in a case where the recording end instruction is not received (NO in ST 208), the flow returns to ST 204.

In a case where the period timer is completed or in a case where the recording end instruction is received (YES in ST 208), reuse area manager 212 registers an area at present of movie box 103 and the header information of free space box 104 (for example, hatching area in FIG. 6A) in the reuse area (ST 209).

Next, in the same manner as ST 107 in FIG. 4, box determiner 208 appends movie box 103 to the tail of AV frame 112 appended in ST 206 (ST 210).

Next, box determiner 208 changes box size 111 of media data box 102 appended in ST 202 to the size of immediately before movie box 103 appended in ST 210 (ST 211).

Next, box determiner 208 determines whether or not a determination result of YES in ST 208 is obtained by receiving the recording end instruction (ST 212). In a case where the determination result of YES in ST 208 is obtained by receiving the recording end instruction (YES in ST 212), the flow is completed.

In a case where the determination result of YES in ST 208 is not obtained by receiving the recording end instruction, that is, in a case where the determination result of YES in ST 208 is obtained by the period timer being completed (NO in ST 212), box determiner 208 appends the header information of free space box 104 to the tail of movie box 103 (ST 213). Then, the flow returns to ST 203.

Effect of Embodiment 2

In Embodiment 2, reuse area manager 212 manages the reuse area inside file 100. In a case where the reuse area equal to or larger than the predetermined size exists, data writer 207 writes the AV frame related to the received stream data to the reuse area. Accordingly, in addition to the effect of Embodiment 1, it is possible to reduce the data size of file 100 than Embodiment 1.

Embodiment 3

In Embodiment 2, it is possible to reduce the size of file 100 as compared with Embodiment 1, but AV frames 112 in media data box 102 are not necessarily arranged in the reproduction order. Many MP4 players can reproduce AV frames 112 even if AV frames 112 are not arranged in the reproduction order, but some MP4 players cannot correctly reproduce AV frames 112 if AV frames 112 are not arranged in the reproduction order. Here, in Embodiment 3, it is possible to reduce the size of file 100 as compared with Embodiment 1, further a method of arranging AV frames 112 in media data box 102 in the reproduction order will be described. Since a configuration of the data recording control device in Embodiment 3 is the same as FIG. 5, descriptions of the configuration will be omitted.

Next, details of a process according to Embodiment 3, of recording the stream data as file 100 in external storage 22 will be described with reference to a schematic diagram of file 100 in FIG. 8 and flowcharts in FIGS. 9 and 10.

First, data recording control device 11 performs processes in ST 301 and ST 302. Since the processes in ST 301 and ST 302 are the same as the processes in ST 101 and ST 102 in FIG. 4, description thereof will be omitted. Hereinafter, a first box determining process will be firstly described with reference to FIG. 9, then second and third box determining processes will be described with reference to FIG. 10.

First Box Determining Process

Box determiner 208 starts the period timer (ST 303).

Figure 8A:
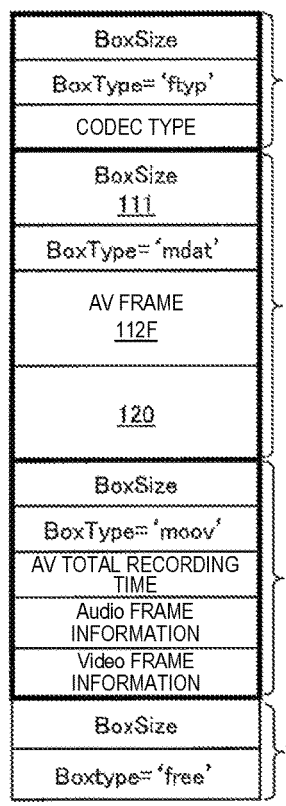
FIGS. 8A-8C are diagrams illustrating a configuration example of a file according to Embodiment 3.

Next, as illustrated in FIG. 8A, data writer 207 appends AV frame 112F to the tail of the header information of media data box 102 appended in ST 302 (ST 304).

Next, data writer 207 holds the AV frame information corresponding to AV frame 112F appended in ST 304, in the memory (ST 305).

Next, box determiner 208 determines whether or not the period timer started in ST 303 is completed (ST 306). In a case where the period timer is not completed (NO in ST 306), the flow returns to ST 304.

In a case where the period timer is completed (YES in ST 306), as illustrated in FIG. 8A, box determiner 208 empties space 120 for the amount of data of AV frame 112 appended in at least one box determining process and appends movie box 103 to the tail of AV frame 112F appended in ST 304 in the same manner as ST 107 in FIG. 1 (ST 307).

Next, box determiner 208 changes box size 111 of media data box 102 to the size of immediately before movie box 103 appended in ST 307 (ST 308).

Next, box determiner 208 appends the header information of free space box 104 to the tail of movie box 103 appended in ST 307 (ST 309). Accordingly, file 100 has the configuration illustrated in FIG. 8A. Then, the flow moves to ST 310 in FIG. 10. Next, the second box determining process will be described with reference to FIG. 10.

Second Box Determining Process

Box determiner 208 starts the period timer (ST 310).

Figure 8B:
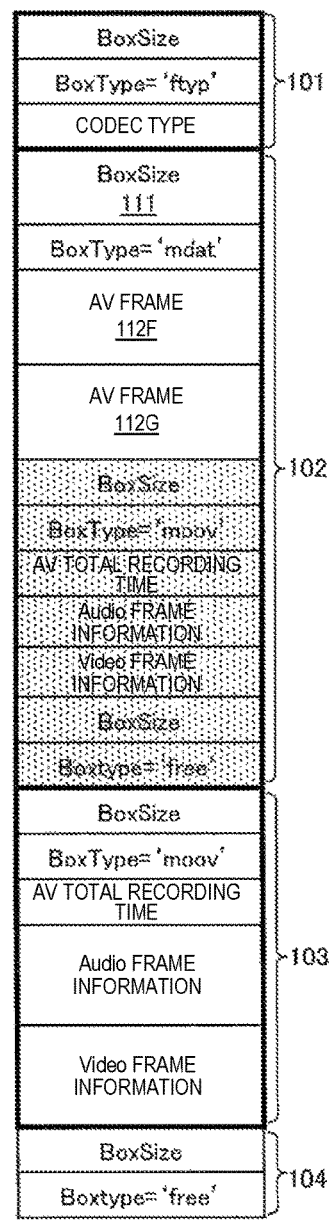

Next, as illustrated in FIG. 8B, data writer 207 appends AV frame 112G to space 120 at the tail of AV frame 112F appended in ST 304 (ST 311).

Next, data writer 207 holds the AV frame information corresponding to AV frame 112G appended in ST 311, in the memory (ST 312).

Next, box determiner 208 determines whether or not the period timer started in ST 310 is completed or whether or not the recording end instruction is received (ST 313).

In a case where the period timer is not completed and in a case where the recording end instruction is not received (NO in ST 313), the flow returns to ST 311.

In a case where the period timer is completed or in a case where the recording end instruction is received (YES in ST 313), as illustrated in FIG. 8B, box determiner 208 appends movie box 103 to the tail of the header information of free space box 104 appended in ST 309 in the same manner as ST 107 in FIG. 1 (ST 314). Even if external storage 22 is removed at this time, since it is not possible to reproduce the AV frame since AV frame 112G is started to be appended until external storage 22 is removed, but the frames following movie box 103 including the AV frame information of AV frame 112F are entirely interpreted by free space box 104 and the MP4 player, the MP4 player can reproduce AV frame 112F.

Next, box determiner 208 changes box size 111 of media data box 102 to the size of immediately before movie box 103 appended in ST 314 (ST 315). Accordingly, file 100 has the configuration illustrated in FIG. 8B. Accordingly, even if external storage 22 is removed after this time, the MP4 player can reproduce AV frames 112F and 112G recorded until at least this time.

Next, box determiner 208 determines whether or not a determination result of YES in ST 313 is obtained by receiving the recording end instruction (ST 316). In a case where the determination result of YES in ST 313 is obtained by receiving the recording end instruction (YES in ST 316), the flow is completed.

In a case where the determination result of YES in ST 313 is not obtained by receiving the recording end instruction, that is, in a case where the determination result of YES in ST 313 is obtained by the period timer being completed (NO in ST 316), as illustrated in FIG. 8B, box determiner 208 appends the header information of free space box 104 to the tail of movie box 103 appended in ST 315 (ST 317). Then, the flow returns to ST 310.

Third Box Determining Process

Box determiner 208 starts the period timer (ST 310).

Figure 8C:
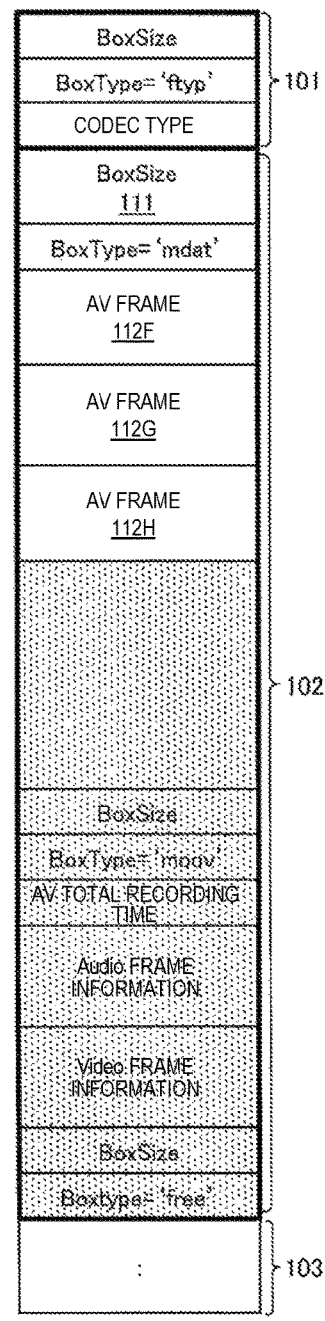

Next, as illustrated in FIG. 8C, data writer 207 appends AV frame 112H to the tail of AV frame 112G appended in ST 304 of the second box determining process (ST 311). That is, data writer 207 writes AV frame 112H to an area (that is, reuse area) in which the previous movie box, which becomes the garbage data, is recorded.

Next, data writer 207 holds the AV frame information corresponding to AV frame 112H appended in ST 311, in the memory (ST 312).

Next, box determiner 208 determines whether or not the period timer started in ST 303 is completed or whether or not the recording end instruction is received (ST 313).

In a case where the period timer is not completed and in a case where the recording end instruction is not received (NO in ST 313), the flow returns to ST 311.

In a case where the period timer is completed or in a case where the recording end instruction is received (YES in ST 313), box determiner 208 appends movie box 103 to the tail of the header information of free space box 104 appended in ST 309 of the second box determining process (ST 314).

Next, box determiner 208 changes box size 111 of media data box 102 to the size of immediately before movie box 103 appended in ST 314 (ST 315). Accordingly, file 100 has the configuration illustrated in FIG. 8C. Accordingly, even if external storage 22 is removed after this time, the MP4 player can reproduce AV frames 112F, 112G, and 112H recorded until at least this time. In addition, AV frames 112F, 112G, and 112H in media data box 102 are arranged in the reproduction order.

Next, box determiner 208 determines whether or not a determination result of YES in ST 313 is obtained by receiving the recording end instruction (ST 316). In a case where the determination result of YES in ST 313 is obtained by receiving the recording end instruction (YES in ST 316), the flow is completed.

In a case where the determination result of YES in ST 313 is not obtained by receiving the recording end instruction, that is, in a case where the determination result of YES in ST 313 is obtained by the period timer being completed (NO in ST 316), box determiner 208 appends the header information of free space box 104 to the tail of movie box 103 appended in ST 315 (ST 317). Then, the flow returns to ST 310. A fourth box determining process and subsequent box determining processes are the same processes as the third box determining process.

Modification Example of Embodiment 3

Figure 9:
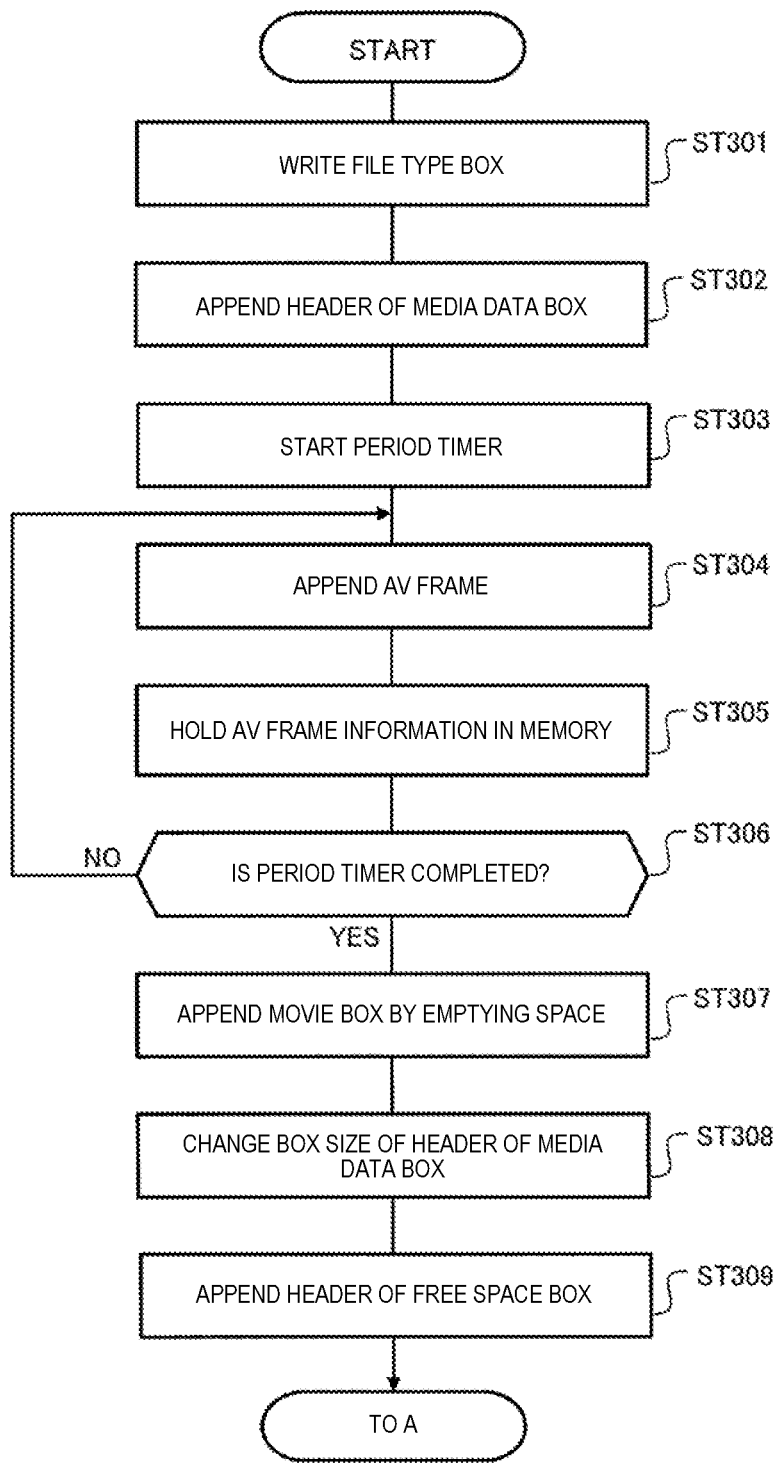
FIG. 9 is a flowchart illustrating an example of a recording process on the external storage according to Embodiment 3.
Figure 10:
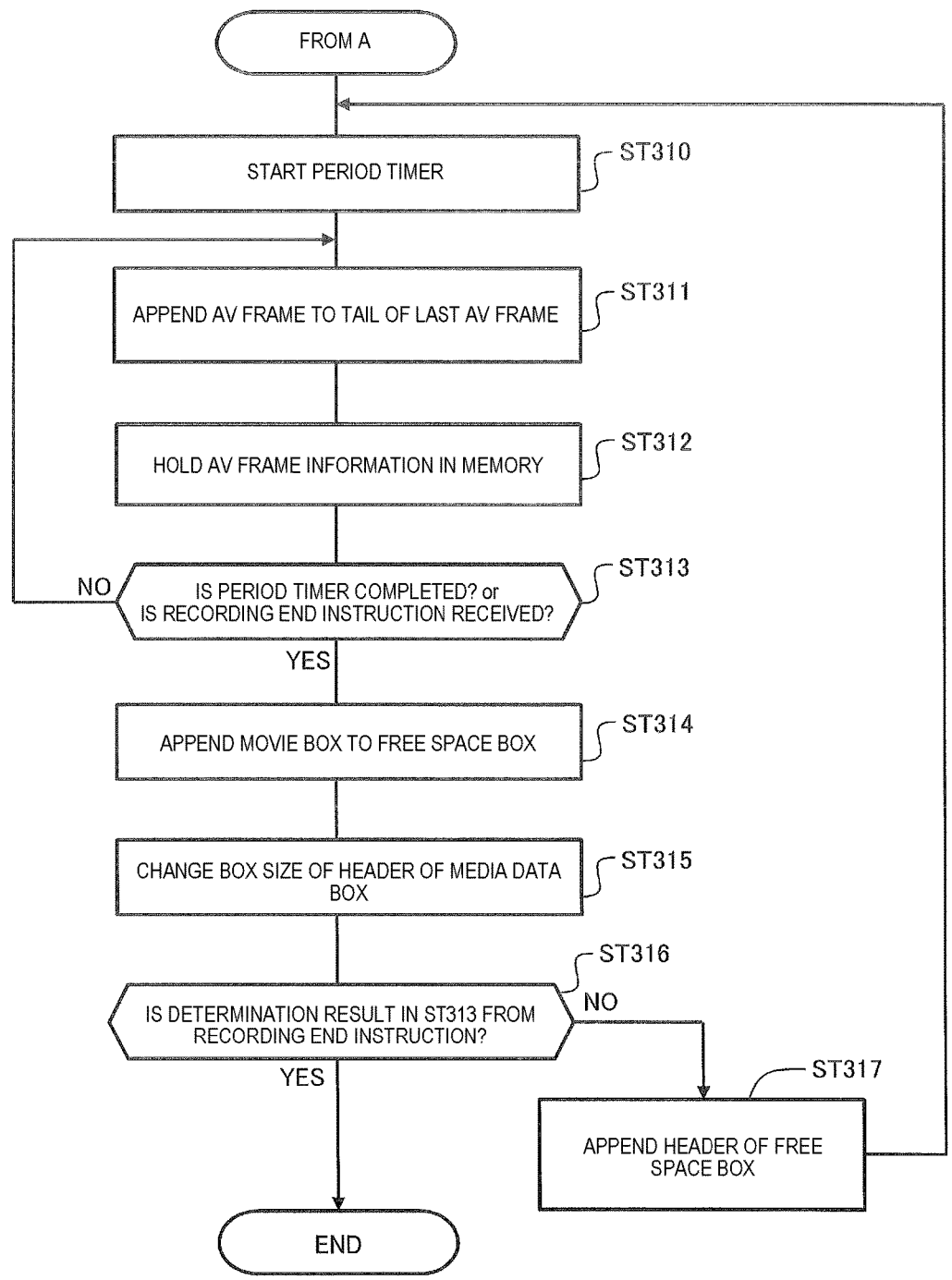
FIG. 10 is a flowchart illustrating an example of a recording process on the external storage according to Embodiment 3.

Since the size of movie box 103 in one box determining process increases as the recording time increases in a case of the processes illustrated in FIGS. 9 and 10, as illustrated in the hatching area in FIG. 8C, the garbage area in media data box 102 is expanded. In Modification Example of Embodiment 3, a method of using the garbage area as the reuse area will be described.

Next, Modification Example of Embodiment 3 will be described with reference to a schematic diagram of file 100 in FIG. 11 and a flowchart in FIG. 12. The flowchart in FIG. 12 continues from the flowchart in FIG. 9.

n-th Box Determining Process

Box determiner 208 starts the period timer (ST 400).

Figure 11A:
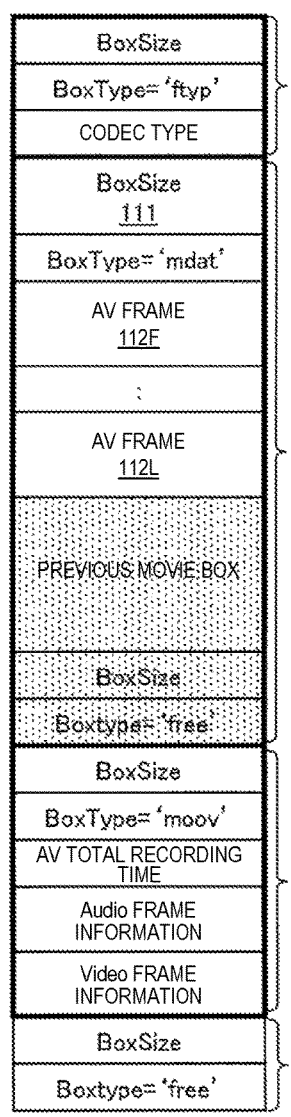
FIGS. 11A-11C are diagrams illustrating a configuration example of a file according to Modification Example of Embodiment 3.
Figure 12:
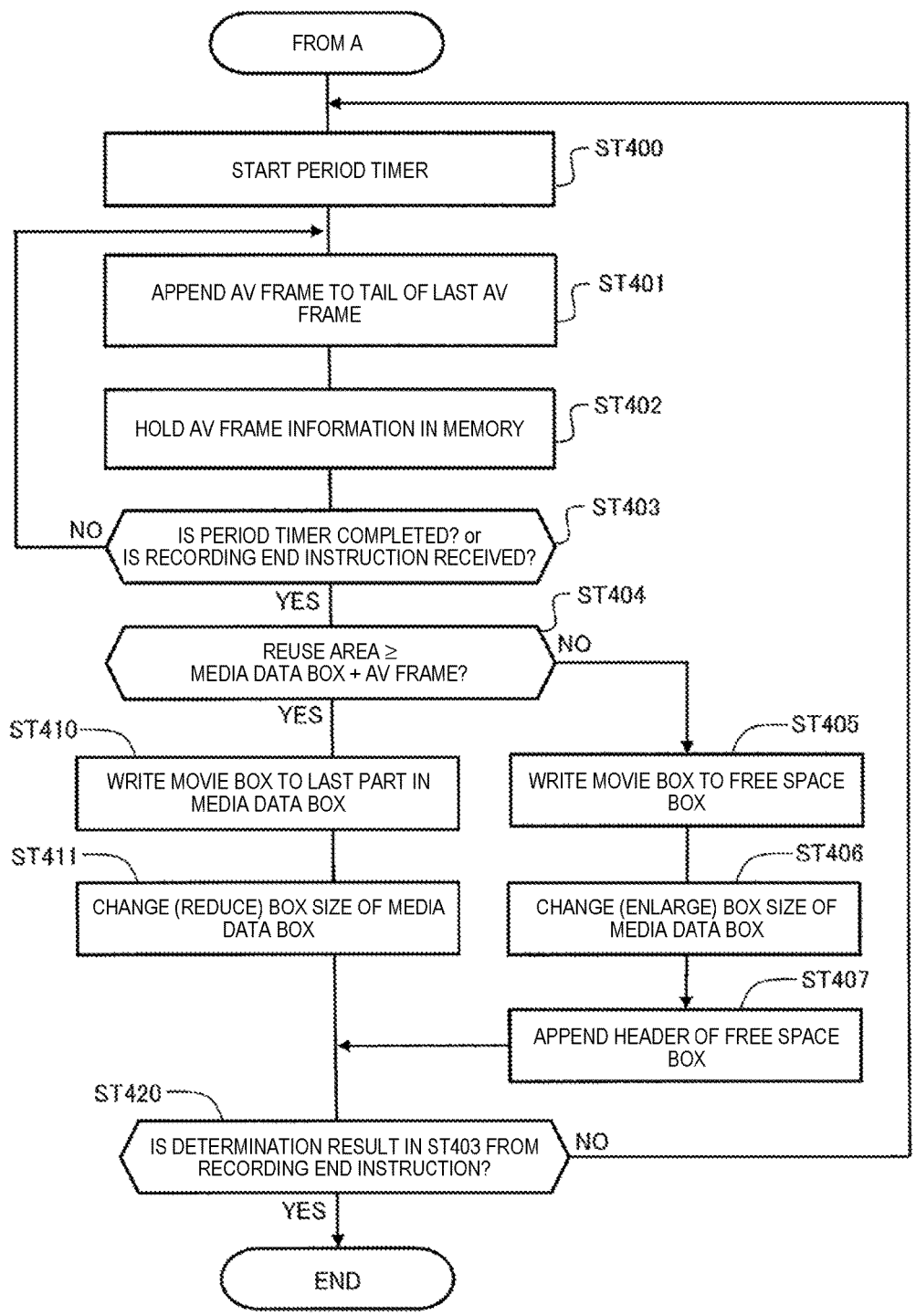
FIG. 12 is a flowchart illustrating an example of a recording process on the external storage according to Modification Example of Embodiment 3.

Next, as illustrated in FIG. 11A, data writer 207 appends AV frame 112L to the tail of AV frame 112 appended at the (n−1)-th time (ST 401). Here, n is an integer equal to or more than 2.

Next, data writer 207 holds the AV frame information corresponding to AV frame 112L appended in ST 401, in the memory (ST 402).

Next, box determiner 208 determines whether or not the period timer started in ST 400 is completed or whether or not the recording end instruction is received (ST 403).

In a case where the period timer is not completed and in a case where the recording end instruction is not received (NO in ST 403), the flow returns to ST 401.

In a case where the period timer is completed or in a case where the recording end instruction is received (YES in ST 403), box determiner 208 determines whether or not the size of the reuse area in media data box 102 is sufficiently large (ST 404). Specifically, box determiner 208 determines whether or not the size of the reuse area is equal to or larger than a sum of the size of movie box 103 to be written in the current box determining process and the size of AV frame 112 to be written in the next box determining process.

In a case where the size of the reuse area is not sufficient (NO in ST 404), box determiner 208 executes the processes from next ST 405 to ST 407.

Figure 11B:
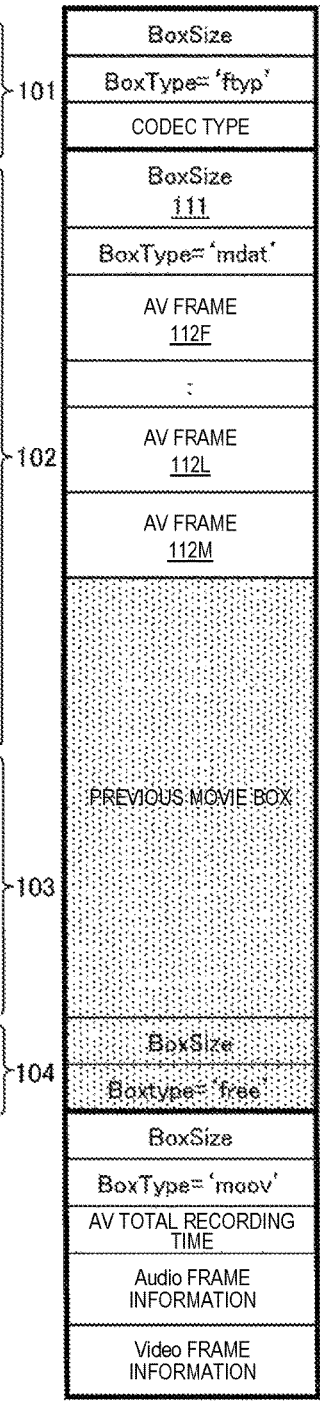

As illustrated in FIG. 11B, box determiner 208 appends movie box 103 to the last tail of the header information of free space box 104 (ST 405).

Next, box determiner 208 changes (enlarges) box size 111 of media data box 102 to the size of immediately before movie box 103 appended in ST 405 (ST 406).

Next, box determiner 208 appends the header information of free space box 104 to the tail of movie box 103 appended in ST 405 (ST 407). Then, the flow moves to ST 420.

On the other hand, in a case where the size of the reuse area is sufficient (YES in ST 404), box determiner 208 executes the processes from next ST 410 to ST 411.

Figure 11C:
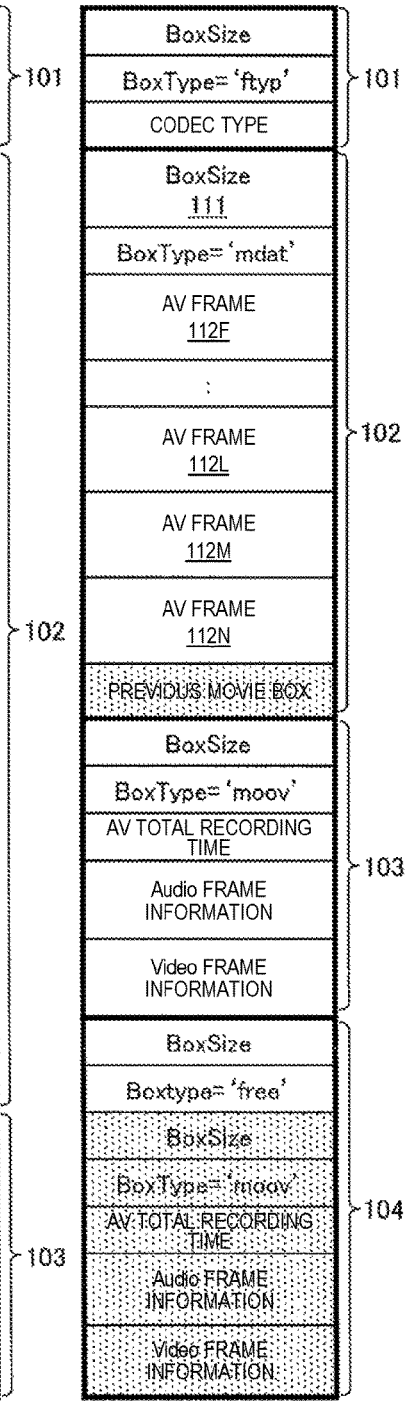

As illustrated in FIG. 11C, box determiner 208 writes movie box 103 to the last part in the reuse area of media data box 102 (ST 410).

Next, box determiner 208 changes (reduces) box size 111 of media data box 102 to the size of immediately before movie box 103 written in ST 410 (ST 411). Then, the flow moves to ST 420.

In ST 420, box determiner 208 determines whether or not a determination result of YES in ST 403 is obtained by receiving the recording end instruction (ST 420). In a case where the determination result of YES in ST 403 is obtained by receiving the recording end instruction (YES in ST 420), the flow is completed.

In a case where the determination result of YES in ST 403 is not obtained by receiving the recording end instruction, that is, in a case where the determination result of YES in ST 403 is obtained by the period timer being completed (NO in ST 420), the flow returns to ST 400.

Effect of Embodiment 3

In Embodiment 3, in the first box determining process, box determiner 208 writes movie box 103 to the tail of AV frame 112 appended in the first box determining process by emptying a predetermined space. In the second box determining process and the subsequent box determining processes, box determiner 208 appends AV frame 112 of the current process to the tail of AV frame 112 appended in the previous process. Accordingly, it is possible to reduce the size of file 100 as compared with Embodiment 1 and it is possible to generate file 100 in which AV frames 112 are arranged in the reproduction order inside media data box 102.

In addition, in Modification Example of Embodiment 3, in a case where the reuse area is sufficiently large, in the box determining process, box determiner 208 writes movie box 103 to the last part in the reuse area and changes (reduces) box size 111 of media data box 102 to the size of immediately before written movie box 103. Accordingly, in addition to the effect of Embodiment 3, it is possible to reduce the data size of file 100 than Embodiment 3.

Although the embodiments according to the present disclosure are described in detail with reference to the drawings, the functions of data recording control devices 10 and 11 described above can be realized by a computer program.

Figure 13:
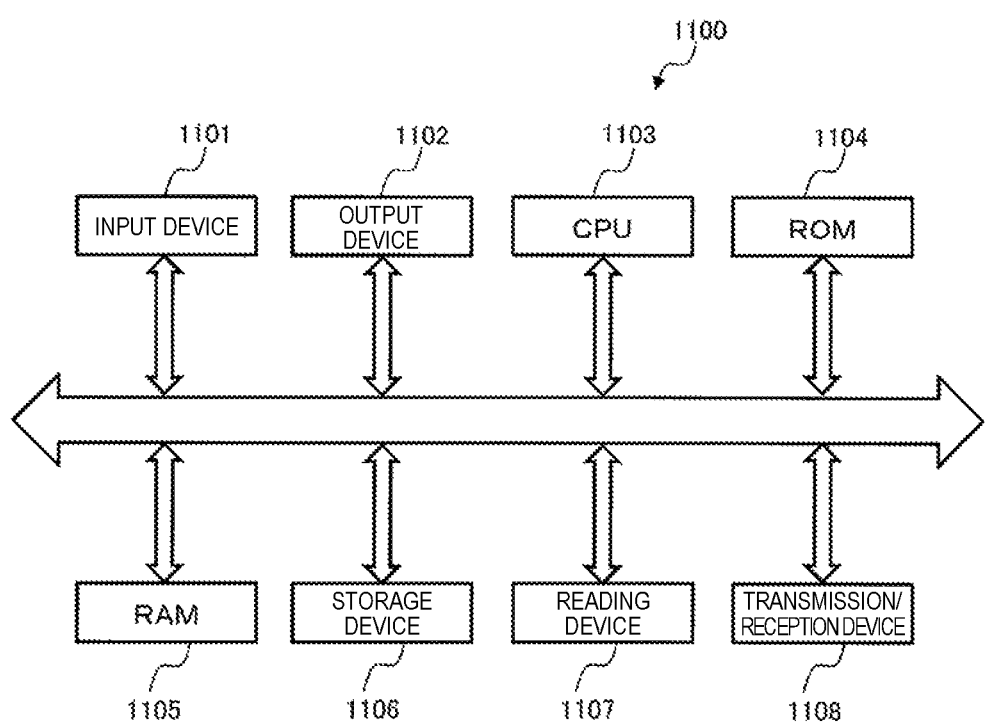
FIG. 13 is a block diagram illustrating a hardware configuration of a computer according to the present disclosure.

FIG. 13 is a diagram illustrating a hardware configuration of a computer which realizes the functions of data recording control devices 10 and 11 by the program. Computer 1100 includes input device 1101 such as a keyboard, a mouse, a touch pad, or the like, output device 1102 such as a display and a speaker, central processing unit (CPU) 1103, read only memory (ROM) 1104, random access memory (RAM) 1105, storage device 1106 such as a hard disk device or a solid state drive (SSD), reading device 1107 for reading information from a recording medium such as a digital versatile disk read only memory (DVD-ROM) and a universal serial bus (USB) memory, transmission/reception device 1108 for performing communication via a network, and is connected with each of units by bus 1109.

Reading device 1107 reads a program for realizing functions of each of the devices, from the recording medium on which the program is recorded and causes storage device 1106 to store the program. Alternately, a network card communicates with a server device connected to the network and causes storage device 1106 to store the program for realizing the functions of each of the devices downloaded from the server device.

Then, CPU 1103 copies the program stored in storage device 1106 to RAM 1105, and sequentially reads and executes commands included in the program from RAM 1105 to realize the functions of each of the devices.

The present disclosure is suitable for recording video and audio streams received via a network in an external storage in a video conference system which is a video conference realized by connecting a plurality of bases via the network.

What is claimed is:

1. A data recording control device which records stream data on a recording media as a file, the device comprising:
   a recording preparator that generates the file which includes a file type box including information related to a type indicating a type of a player capable of reproducing the file and header information of a media data box storing media data according to the stream data, on the recording media;
   a box determiner that writes a movie box which includes information used for reproducing the media data, updates a box size included in the header information of the media data box to a size of immediately before the movie box, and appends header information of a free space box which stores predetermined information to a tail of the movie box, during a predetermined period; and
   a data writer that appends the media data according to the stream data to a tail of the header information of the free space box.

2. The data recording control device of claim 1, further comprising:
   a reuse area manager that manages an area of the original movie box which is included in the media data box and which becomes a garbage by updating the box size of the media data box, as a reuse area,
   wherein in a case where the reuse area is equal to or larger than a predetermined size, the data writer writes the media data to the reuse area.

3. The data recording control device of claim 1,
   wherein the box determiner provides a predetermined space area at a tail of the media data appended to the file and writes the movie box to a tail of the space area when firstly writing the movie box, and
   the data writer appends the media data to a tail of the lastly written media data, in order.

4. The data recording control device of claim 3, further comprising:
   a reuse area manager that manages an area of the original movie box which is included in the media data box and which becomes a garbage by updating the box size of the media data box, as a reuse area,
   wherein in a case where the reuse area is equal to or larger than a predetermined size, the box determiner writes the movie box to the reuse area.

5. A data recording control method for recording stream data on a recording media as a file, the method comprising:
   generating the file which includes a file type box including information related to a type of the file and header information of a media data box storing media data according to the stream data, on the recording media; and
   executing (X1) to (X4) during a predetermined period,
   (X1) writing a movie box which includes information used for reproducing the media data to the file,
   (X2) updating a box size included in header information of the media data box to a size of immediately before the movie box,
   (X3) appending header information of a free space box storing predetermined information to a tail of the movie box, and
   (X4) appending the media data according to the stream data to a tail of the header information of the free space box.

* * * * *